United States Patent Office 2,768,290
Patented Oct. 23, 1956

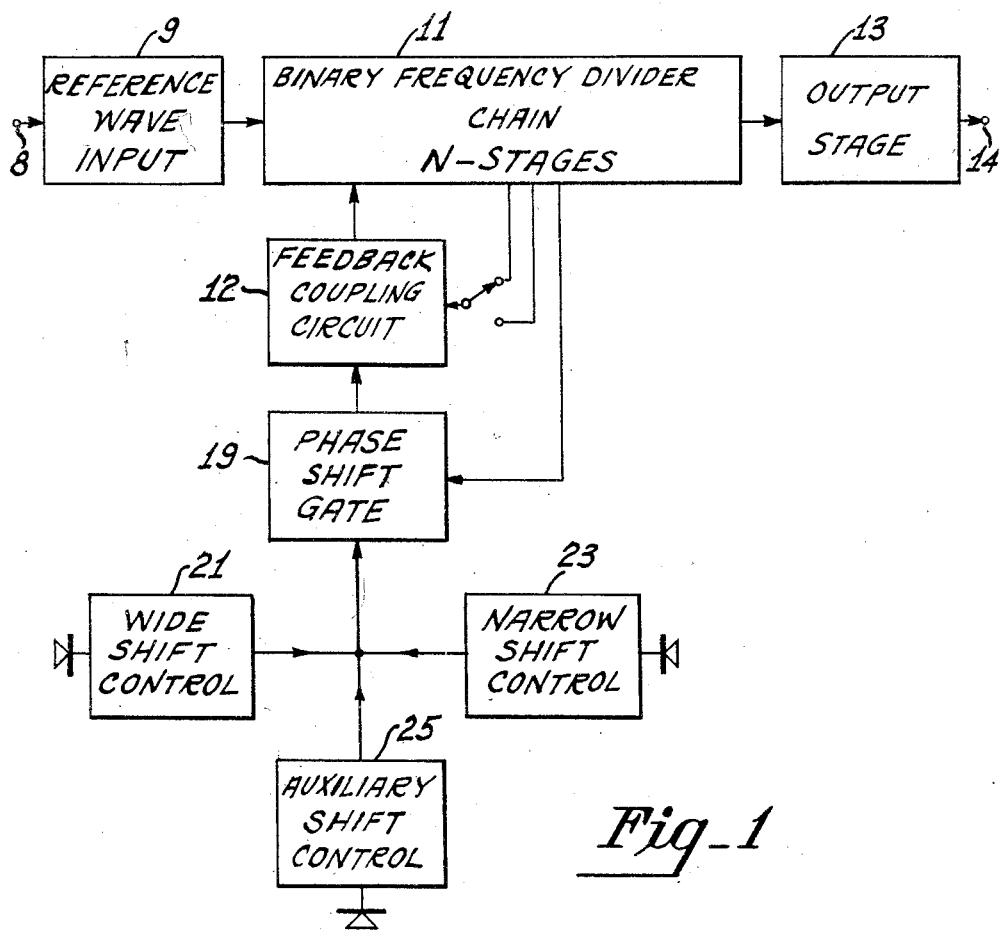
Fig_1

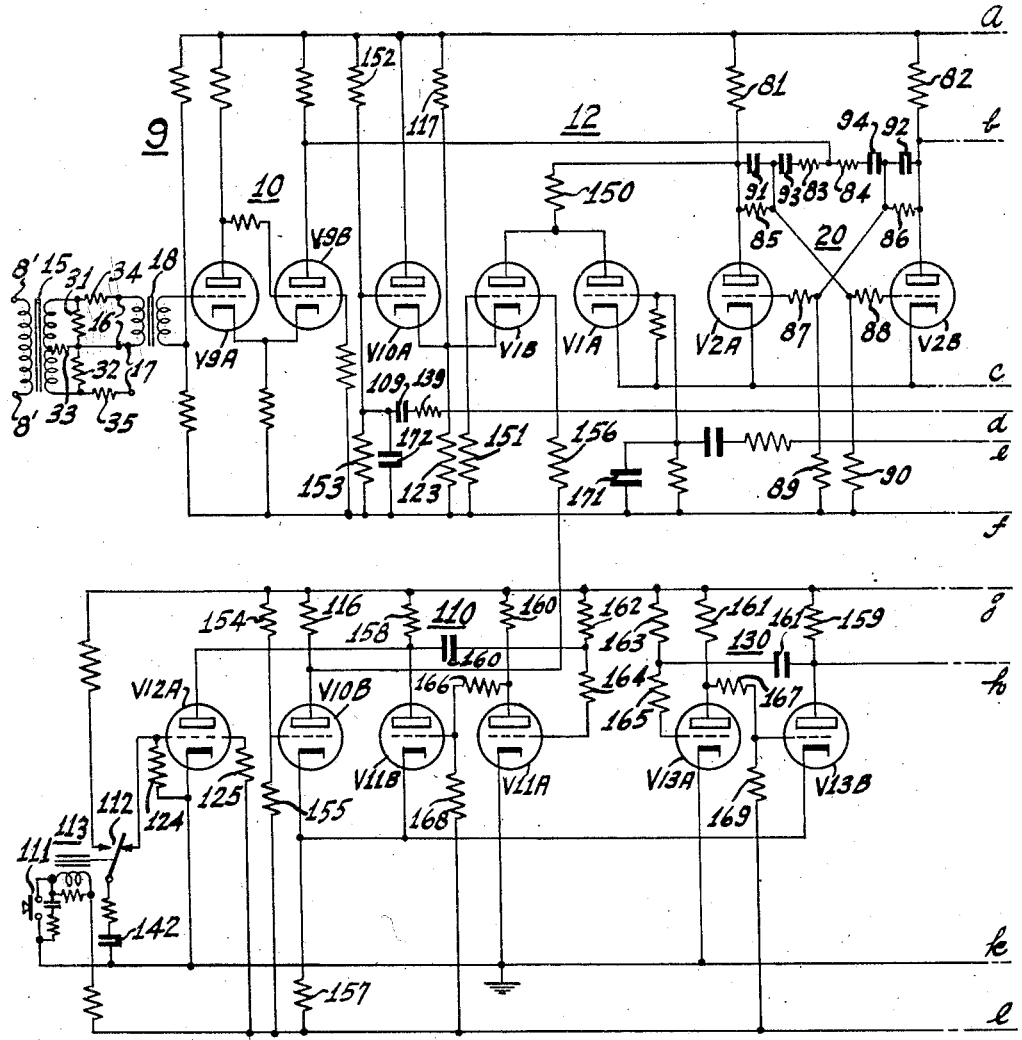
Fig_2(a)
INVENTORS
James S. Harris
& Chester W. Latimer
BY Charles H. Brown
ATTORNEY Oct. 23, 1956 J. S. HARRIS ET AL 2,768,290
TELEGRAPH PHASE SHIFTING EQUIPMENT
Filed April 23, 1953 3 Sheets-Sheet 3
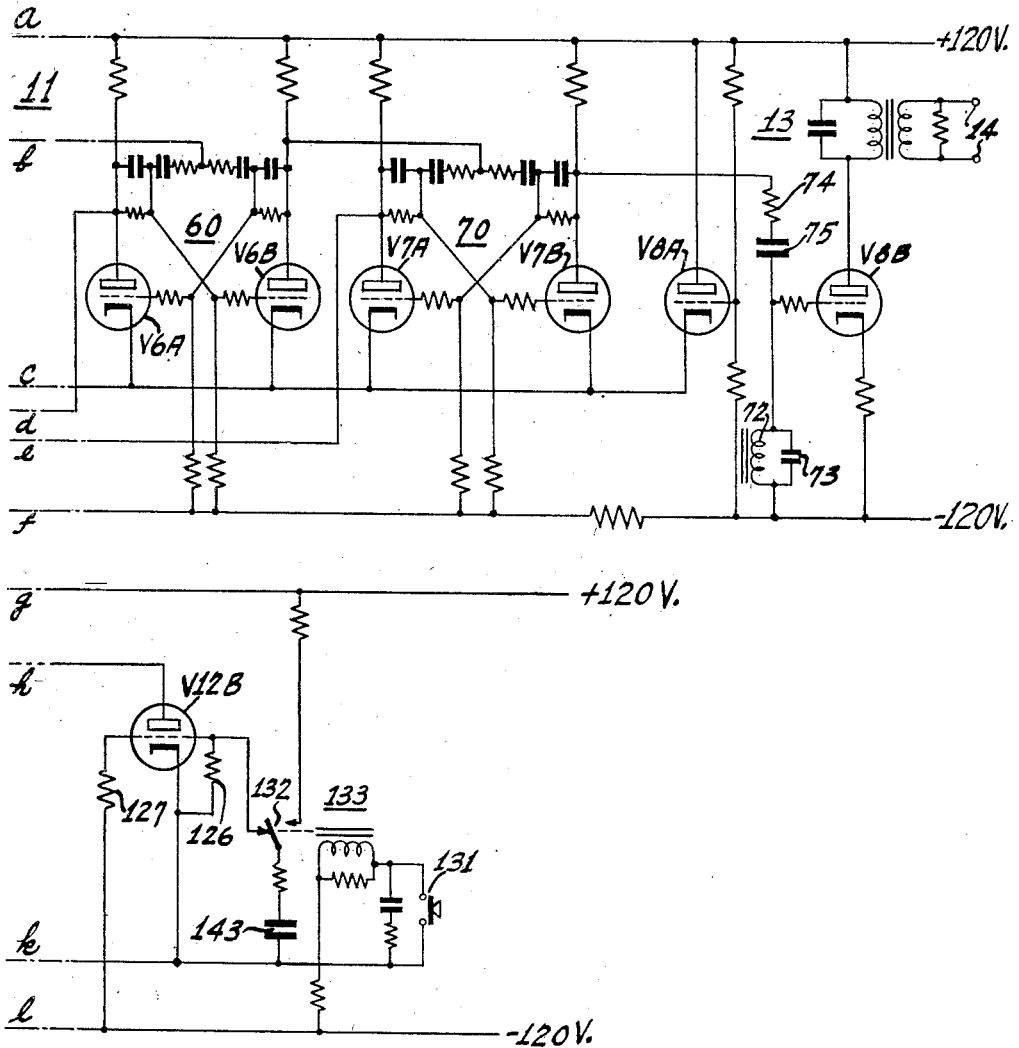
*Fig. 2(b)*
KEY TO FIG. 2
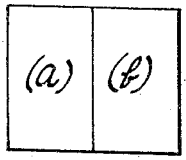
INVENTORS
James S. Harris
& Chester W. Latimer
BY Charles H. Brown
ATTORNEY

2,768,290

TELEGRAPH PHASE SHIFTING EQUIPMENT

James Stallings Harris, Old Greenwich, Conn., and Chester Willson Latimer, West Orange, N. J., assignors to Radio Corporation of America, a corporation of Delaware Application April 23, 1953, Serial No. 350,566

4 Claims. (Cl. 250—27)

The invention relates to telegraph systems and particularly to synchronous telegraph systems in which proper phase relationships must be maintained between the sending and receiving equipment without the necessity for transmitting special synchronizing signal elements.

In systems in which mechanical scanning is employed with a synchronously rotating electric motor, changes in phase must be made slowly in order to overcome the inertia of the motor armature. In previous systems, one method of correcting phase has been to rotate the stator of this motor over a small angle in order relatively to advance or retard the armature. In another prior arrangement, the reference frequency source has been changed by directly influencing the frequency determining component, usually a tuning fork. In neither case has means been provided to make phase corrections in discrete steps, but rather the correction influence has been continued manually until such time as the normal operating correction arrangement employed for synchronization could take control and gradually bring the receiving machinery into the desired in-phase relationship.

In fully electronic multiplex systems where no mechanical mass is involved, it has been possible to realize "push-button" phasing where a discrete advance or retard in phase is obtained at each manipulation of the control element in an appropriate circuit, usually by means of a push-button switch. In attempts to adapt this arrangement, it has been found that when the mechanical transmitting and receiving machines were operating synchronously but out of the proper phase relationship, it was not possible to make discrete adjustments in order to obtain promptly the proper phase relationship. On the contrary, it has been necessary to retain the manual approach to the proper phase relationship and then arrange the normal synchronizing system of the receiving machinery to take over and complete the correction. This is a slow, and relatively haphazard method of obtaining the proper phasing, sometimes requiring as much as fifteen to twenty minutes in order to obtain proper phasing in existing equipment.

An object of the invention is to provide means whereby discrete changes in phase may be obtained in a wave derived from a source of standard frequency for operating mechanical telegraph apparatus.

Another object of the invention is to provide improved means for obtaining such phase changes in an electromechanical system in response to manipulation of a simple manual control, such as a push-button.

A further object of the invention is to enable different degrees of correction in mechanical telegraph apparatus to be obtained by selection of wide shift and narrow shift push-button controls.

Still another object of the invention is to provide a gating system whereby individual timing circuits can operate the gate without interaction between the timing circuits;

A still further object of the invention is to provide improved means whereby an accurate source of standard reference frequency for obtaining synchronous operation of both sending and receiving telegraphic equipment may be used as a reference for several receiving and/or transmitting equipments.

The objects of the invention are attained in an electromechanical telegraph system by a frequency divider, comprising a plurality of binary reciproconductive circuits connected in cascade which divides a standard reference frequency wave by a predetermined factor for application to a synchronous motor driving the associated telegraph apparatus; preferably through the intermediary of a wave shaping circuit for operating the motor on a sine wave current. Depending on the dividing factor, a regenerative or feedback circuit may be used to alter the ratio of division afforded by the cascaded binary circuits. According to the invention, phase shift is provided by a regenerative feedback or reset circuit, in addition to any other feedback circuit that may be present, which is gated in and out of operation in response to the demand for phase shift to alter the normal dividing factor. The gating may be arranged to advance or retard the phase of the output wave relative to the input wave, as desired, or to do either alternately, but preferably by advancing the phase only. Preferably monostable reciproconductive circuits are employed to trigger the gate in response to the manipulation of a manual control, such as by releasing push-button or relay contacts. A gating circuit permits the gating of the reset pulses for different periods of time as determined by a plurality of monostable control reciproconductive circuits without interaction between the control circuits.

The invention will be described with reference to a particular embodiment thereof, given by way of example only, and illustrated by the accompanying drawing in which:

Fig. 1 is a functional diagram of a circuit arrangement according to the invention; and Fig. 2 (sections a and b taken together) is a schematic diagram of an embodiment of the invention illustrated in Fig. 1.

Referring to Fig. 1, there is shown an arrangement for developing driving power of proper frequency for application to a synchronous motor used to drive the mechanical distributor of telegraph receiving apparatus. A reference wave input stage 9, delivers a square wave of frequency $f$, in response to a sine wave of frequency $f$ applied at the terminal 8 to a binary frequency divider 11 comprising a plurality of $n$ stages. The frequency divider 11 basically operates to divide the frequency $f$ by a factor $2^n$. A feedback coupling circuit 12 is arranged in known manner between individual stages of the frequency divider chain to reduce the dividing factor where an integral power of the number 2 does not provide a convenient divisor, as for example, when a factor of 7 is desired which is recognized as $2^3-1$. The square wave output of the divider 11 is applied to an output stage 13 which incorporates an appropriate band pass filter to convert the square wave to sine wave and provide the necessary current and/or voltage amplification required for the utilization circuit to be connected at the terminal 14.

According to the invention a shift in phase of the output wave at the terminal 14 with respect to the input wave at the terminal 8 is obtained by varying the dividing factor of the frequency divider 11 for a definite period of time. This objective is accomplished by means of a phase shift gating circuit 19 which serves to apply a feedback potential obtained from a predetermined stage of the frequency divider chain 11 to the feedback coupling circuit 12 under the control of one or more control circuits shown in Fig. 1 as a wide shift control circuit 21, a narrow shift control circuit 23 and an auxiliary shift control circuit 25. Preferably the phase shifting gate 19 is an electronic tube gating device having the condition of conduction altered for a given time period in response to the control circuits which may be counting chains of substantially the same or similar construction as the binary frequency dividing chain, monostable reciproconductive circuits or other timing devices.

Referring to Fig. 2, a reference sine wave of 2400 C. P. S. is applied to the primary winding of an isolating transformer 15. The secondary of the isolating transformer 15 is connected to two separate sets of output terminals 16 and 17. Through the connections of resistors 31, 32 and 33 to the secondary of transformer 15 and to the output terminals 16 and 17, a "hybrid" effect is obtained which effectively decouples the two outputs from each other. An accidental short circuit across one pair of terminals will have practically no effect on the amplitude of the output across the other pair of terminals. Therefore, the same reference frequency wave source can be coupled to other equipments without interfering with the first.

The 2400 cycle/second signal is applied to the primary winding of an input transformer 18. The amplified voltage across the secondary of the transformer 18 feeds a bistable multivibrator or reciproconductive circuit 10 comprising two electron discharge tubes V9A and V9B and associated components which delivers a square wave of 2400 cycle/second output from the anode of the tube V9B.

The term "reciproconductive circuit," as employed herein, is construed to include all two tube regenerative devices in which conduction alternates in one or the other tube in response to applied triggering potential. The term "multivibrator" is sometimes applied to this circuit and the term "locking circuit" is sometimes applied to a bistable reciproconductive circuit which is one in which two triggers are required to switch from one stable state to the other and return. The term "binary" circuit is more often applied to the particular form of bistable reciproconductive circuit commonly used for frequency dividing and counting chains. A similar circuit requiring only one trigger to change conducting states and having automatic restoration depending on the time constants is called the monostable reciproconductive circuit.

The square wave output from the tube V9B is applied to the input of a binary frequency divider chain 11 consisting of six binary reciproconductive circuits 20, 30, 40, 50, 60 and 70, of which circuits 30—50 are not shown because all of the reciproconductive circuits in the chain are preferably identical in construction. If desired for any reason, however, changes may be made in the connections of these circuits in accordance with well-known practice.

The cathode potentials of each of the tubes V2A—V7B are stabilized by means of the cathode follower action of a triode regulator tube V8A. This six stage binary divider chain will divide the input frequency by a factor of 2 to the exponent 6 or 64. A triode tube V1A is provided to allow use of pulse feedback in order to divide by a different ratio to obtain the desired output frequency. This feedback circuit is conventional, with the tube V1A normally biased to cut off and with the feedback circuit furnishing differentiated pulses of positive polarity in proper phase relation to cause the momentary conduction of V1A to reverse the state of conduction of the tubes V2A and V2B. A connection is shown from the anode of the tube V7A of the reciproconductive circuit 70 to the grid of the tube V1A as an example only of the connections to the divider chain. In order to obtain a wave of 42⁶⁄₇ cycles per second, feedback is taken in exactly the same manner from the anode of the tube V4A of the third binary stage 40 and the division ratio becomes $(2^3-1)2^3=56$, and $2400/56=42\tfrac{6}{7}$. For a wave of 50 cycles per second, feedback is taken from the anode of the tube V3A of the second stage 30 and the division ratio is $(2^2-1)2^4=3\times16=48$, and $2400/48=50$.

The last stage 70 of the binary divider chain is coupled through a current limiting resistor 74 and capacitor 75 to a single band-pass resonant circuit, consisting of an inductor 72 and a capacitor 73 to provide a sinusoidal voltage at the grid of the final output triode V8B. The output of the tube V8B is applied in practice through the intermediary of a power amplifier to the armature of the distributor driving motor (not shown).

In order to allow rapid phasing, additional circuits comprising a second feedback coupling electron discharge device or vacuum tube V1B, a gate 19 comprising two tubes V10A and V10B and a pair of gate control circuits 110 and 130 are provided. The feedback coupling tube V1B is normally biased to cutoff, while the tube V10A and V10B function as a two-stage gate to apply feedback pulses from the anode of the tube V6A of the fifth stage 60 of the binary divider chain to the first stage 20 when desired under the control of timing circuits 110 or 130 selected by manipulation of push buttons 111 and 131.

Four triodes V11A, V11B, V13A and V13B are connected as monostable multivibrators or reciproconductive circuits in timing circuits 110 and 130 which are identical, except for the time constants. Other such reciproconductive circuits may be added, if desired, in accordance with the data below. Normally, the reciproconductive circuits are in the stable condition, with the tubes of V11A and V13A conducting, and thus the grid voltages of the non-conducting tubes V11B and V13B are low. The cathodes of the normally non-conducting tubes V11B and V13B are connected to the cathode of the gating tube V10B. The grid of the tube V10B is at such a potential that the cathode follower action of this tube determines the minimum potential of the common bus connecting the cathodes at the normally nonconducting tubes in the various monostable reciproconductive circuits. Thus these cathodes are assured of being sufficiently positive with respect to their grids that they remain monostable.

When any one of these monostable circuits is triggered to the unstable condition then the grid voltage of its normally nonconducting section is raised above the grid voltage of V10B so that the potential at this common cathode bus is raised (due to conduction in this normally nonconducting tube) and hence all other monostable circuits remain in their normal condition while V10B is cutoff. Thus there is no adverse interaction between the various monostable reciproconductive circuits, no matter how many such circuits are employed.

The current flow through the anode resistor 116 of the tube V10B causes a voltage drop across the resistor and the coupling to the grid of the tube V1B assures that the tube V1B is completely blocked. Pulses from the anode of the tube V6A differentiated by means of a capacitor 109 and a resistor 139 are applied to the grid of the tube V10A and the cathode circuit produces positive and negative pulse output, with the negative pulses limited in amplitude by the cathode bias voltage due to resistors 117 and 123. This tube V10A is cathode coupled to the tube V1B, so that the pulses are applied to the cathode of V1B. Positive pulses have no effect, and negative pulses have no effect when the tube V10B is conducting. If, however, the tube V10B is blocked then the tube V1B will conduct momentarily on negative pulse from the tube V6A, and will cause the reciproconductive circuit 20 to reverse state each time the tube V1B conducts, thereby changing the division ration of the binary divider chain. Thus, during any interval of time in which the tube V10B is non-conducting or blocked the output frequency of the divider 11 will be changed from normal. When conduction of the tube V10B is resumed, the output frequency will return to its normal value, but may be considered to have undergone a phase change due to the interval of frequency change.

If either monostable reciproconductive circuit 110 or 130 is triggered to the unstable state of conduction, the increase in grid potential of the normally non-conducting section will cause that section to conduct and at the same time raise the potential of the cathode of the tube V10B and block it, thus causing a change in frequency as described. This frequency change will endure until the monostable reciproconductive circuit is restored to the stable state. Thus, the time constant of the monostable circuit may be considered the factor which determines the amount of phase-change accomplished for each time the monostable circuit is triggered. Two separate reciproconductive circuits 110 and 130 with a 2 to 1 time constant relationship are shown to provide two discrete phase correction increments. Other monostable reciproconductive circuits may also be incorporated to provide other correction increments, if desired. The coupling circuitry described will prevent interaction no matter how many such circuits are employed. The reciproconductive circuits 110 and 130 are triggered by means of the associated control tubes V12A and V12B and the circuitry associated therewith. Both tubes V12A and V12B are normally blocked, due to the negative grid bias supplied by resistors 124, 125 and 126, 127.

When either of the contact sections 112 or 132, which may be push-button switches or contact structures of relays 113 or 133, are operated, the capacitor 142 or 143 associated with the tongue receives a positive charge, and when the contact section is released, a positive pulse is applied to the grid of the corresponding tube V12A or V12B causing momentary conduction and triggering the associated reciproconductive circuit. The coils of the relays are arranged to be activated by neutral connection made by an external push-button 111 or 131 and release of the push-button serves to trigger the reciproconductive circuit. Relay control is preferably used and the push-buttons 111 and 131 are normally mounted in another location more convenient to the operating personnel than is the frequency divider.

In one practical application of the invention, the time constants of the reciproconductive circuits 110 and 130 were arranged to provide phase advances of ¼ cycle (corresponding to a displacement of one 4-channel aggregate signal band) for each operation of the "Slow Advance" circuit, a ½ cycle (corresponding to one diplex or 2-channel aggregate band) for each operation of the "Fast Advance" circuit. It will be noted that in the 42% cycle case the frequency division during operation of these circuits becomes $\{[(2^2-1)2^3]-1\}2=46$, instead of 56, and in the 50 cycle case it becomes $\{[(2^2-1)2^3]-1\}=46$, instead of 48.

The tuned circuit 72—73 is resonated at the mean frequency of the two conditions in order that the voltages at the grid of the tube V8B be of the same amplitude for both frequencies. The change in frequency is at slow enough rate that the conventional motor is able to follow the change without difficulty.

In the above mentioned constructed embodiment the following values were used for pertinent component parts. Obviously, other values may be used for different keying speeds and the like.

Tubes

| Ref. Nr.: | Type |
|---|---|
| V1A—V13B | 5963 |

Resistors

| Ref. Nr.: | | Value |
|---|---|---|
| 31 | ohms | 560 |
| 32 | do | 560 |
| 33 | do | 280 |
| 34 | kilohms | 51 |
| 35 | do | 51 |
| 74 | megohms | 3.3–4.7 |
| 81–82 | kilohms | 220 |
| 83–84 | do | 390 |
| 85–86 | megohms | 2.2 |
| 87–88 | kilohms | 390 |
| 89–90 | megohms | 1.2 |
| 116–117 | kilohms | 82 |
| 123 | do | 39 |
| 124 | do | 220 |
| 125 | do | 220 |
| 126–127 | do | 220 |
| 139 | do | 390 |
| 150 | do | 120 |
| 152–153 | megohms | 2.2 |
| 154 | kilohms | 560 |
| 155 | do | 390 |
| 156 | do | 680 |
| 157 | do | 82 |
| 158–159 | do | 68 |
| 160–161 | do | 220 |
| 162–163 | megohms | 6.2 |
| 164–165 | kilohms | 390 |
| 166–167 | do | 300 |
| 168–169 | do | 510 |

Capacitors

| Ref. Nr.: | | Value |
|---|---|---|
| 73 | µfd | [1] 0.029 |
| 75 | µfd | 0.01 |
| 109 | µµfd | 47 |
| 142 | µfd | 0.01 |
| 143 | µfd | 0.01 |
| 91–92 | µµfd | 100 |
| 93–94 | µµfd | 47 |
| 160 | µfd | 0.1 |
| 161 | µfd | 0.05 |
| 171–172 | µµfd | 47 |

Inductor

| Ref. Nr.: | | Value |
|---|---|---|
| 72 | henries | [1] 450 |

[1] Nominal value.

The invention claimed is:

1. A control circuit arrangement comprising a plurality of reciproconductive circuits each including one normally blocked electron discharge device having at least a grid and a cathode element, electron discharge structure having at least cathode, grid and anode elements, all of said cathode elements being connected together, the elements of said electron discharge structure having potentials thereon rendering the structure normally conducting to establish the potential of all of said cathode elements at a value positive with respect to said grids, and means to trigger one of said reciproconductive circuits to the state of conduction wherein said one electron discharge device is conducting, said electron discharge structure being blocked upon any one reciproconductive circuit being triggered and the potential at said common cathode connection being raised to impress further bias between the cathode element and the grid of each of the other normally blocked electron discharge devices, thereby to prevent any of the other reciproconductive circuits from being triggered until the triggered circuit is restored to the initial state of conduction, an output electron discharge system, said output electron discharge system having cathode and anode electrodes, a further electron discharge system having a cathode electrode and grid and anode members, means coupling the two last mentioned cathode electrodes together, and means to pulse said members of said further electron discharge system to pulse said output electron discharge system in response to the triggering of any one of said reciproconductive circuits.

2. A control circuit arrangement comprising a plurality of reciproconductive circuits each including one normally blocked electron discharge device having at least a grid and a cathode element, an electron discharge structure having at least cathode, grid and anode elements, all of said cathode elements being connected together, the elements of said electron discharge structure having potentials thereon rendering the structure normally conducting to establish the potential of all of said cathode elements at a value positive with respect to said grids, an output terminal coupled to said anode element, and means to trigger said reciproconductive circuits to the state of conduction wherein said one electron discharge device is conducting, said electron discharge structure being blocked upon any one reciproconductive circuit being triggered and the potential at said common cathode connection being raised to impress further bias between the cathode element and the grid of each of the other normally blocked electron discharge devices, thereby to prevent any of the other reciproconductive circuits from being triggered until the triggered circuit is restored to the initial state of conduction, a normally blocked output electron discharge system having a control electrode coupled to the anode element of said electron discharge structure to be rendered conducting in response to the blocking of said other electron discharge structure, said output electron discharge device having cathode and anode electrodes, a further electron discharge system having a cathode electrode and grid and anode members, means coupling the two last mentioned cathode electrodes together, and means to pulse said members of said further electron discharge system to pulse said output electron discharge system in response to the triggering of any one of said reciproconductive circuits.

3. A control system for the division changing feedback loop of a frequency dividing chain, comprising, a plurality of monostable multivibrators, an equal plurality of triggering circuits each coupled to a respective one of said multivibrators, said multivibrators each including a normally non-conducting electron discharge device having a cathode from which output pulses of different time durations are provided, a gate circuit including an electron discharge device having a cathode connected to said cathodes in said multivibrators, an output circuit including first and second electron discharge devices having output electrodes and having input electrodes including cathodes, said cathodes being connected together, means coupling the output of said gate circuit to an input electrode of said first electron discharge device, and means to insert an input electrode of said second electron discharge device and an output electrode of said first electron discharge device in said feedback loop of said frequency dividing chain.

4. A control system for the division changing feedback loop of a frequency dividing chain, comprising, a plurality of monostable multivibrators, an equal plurality of manually operated triggering circuits each coupled to a respective one of said multivibrators, said multivibrators each including a normally non-conducting electron discharge device having a cathode from which output pulses of different time durations are provided, a gate circuit including an electron discharge device having a cathode connected to said cathodes in said multivibrators, an output circuit including first and second electron discharge devices having output electrodes and having input electrodes including cathodes, said cathodes being connected together, means coupling the output of said gate circuit to an input electrode of said first electron discharge device, and means to insert an input electrode of said second electron discharge device and an output electrode of said first electron discharge device in said feedback loop of said frequency dividing chain.

References Cited in the file of this patent

UNITED STATES PATENTS

| | | |
|---|---|---|
| 1,802,738 | Roberts | Apr. 28, 1931 |
| 2,475,625 | Lyons | July 12, 1944 |
| 2,409,474 | Clapp | Oct. 15, 1946 |
| 2,477,047 | Davis | July 26, 1949 |
| 2,493,058 | Bliss | Jan. 3, 1950 |
| 2,496,994 | Goldberg | Feb. 7, 1950 |
| 2,515,195 | Clark | July 18, 1950 |
| 2,589,465 | Weiner | Mar. 18, 1952 |
| 2,626,357 | McClellan | Jan. 20, 1953 |